United States Patent
Wentink et al.

(10) Patent No.: US 8,989,212 B2
(45) Date of Patent: *Mar. 24, 2015

(54) SYSTEMS AND METHODS FOR COEXISTENCE OF WLAN AND BLUETOOTH NETWORKS

(71) Applicant: Conexant Systems, Inc., Irvine, CA (US)

(72) Inventors: Menzo Wentink, Utrecht (NL); Doug Berger, Las Flores, CA (US); Trent Carter, San Jose, CA (US)

(73) Assignee: Conexant Systems, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/183,308

(22) Filed: Feb. 18, 2014

(65) Prior Publication Data

US 2014/0169249 A1    Jun. 19, 2014

Related U.S. Application Data

(63) Continuation of application No. 11/947,946, filed on Nov. 30, 2007, now Pat. No. 8,654,773.

(60) Provisional application No. 60/861,799, filed on Nov. 30, 2006.

(51) Int. Cl.
| | |
|---|---|
| *H04L 12/43* | (2006.01) |
| *H04L 12/28* | (2006.01) |
| *H04B 7/005* | (2006.01) |
| *H04W 4/00* | (2009.01) |
| *H04W 52/02* | (2009.01) |

(Continued)

(52) U.S. Cl.
CPC ........ *H04W 52/0206* (2013.01); *H04W 74/085* (2013.01); *H04W 52/0216* (2013.01); *H04W 52/0219* (2013.01); *H04W 88/06* (2013.01); *Y02B 60/50* (2013.01)
USPC ........... 370/461; 370/235; 370/252; 370/278; 370/338

(58) Field of Classification Search
USPC ......... 370/230, 235, 252, 278, 282, 338, 461, 370/468
See application file for complete search history.

(56) References Cited

U.S. PATENT DOCUMENTS

| | | | |
|---|---|---|---|
| 2002/0061031 A1* | 5/2002 | Sugar et al. | 370/466 |
| 2002/0136183 A1* | 9/2002 | Chen et al. | 370/338 |

(Continued)

OTHER PUBLICATIONS

United States Patent and Trademark Office; International Search Report and Written Opinion; PCT Application No. PCT/US07/86003; May 7, 2008.

(Continued)

*Primary Examiner* — Redentor Pasia
(74) *Attorney, Agent, or Firm* — Haynes and Boone, LLP

(57) ABSTRACT

Systems and methods for coexistence of WLAN and Bluetooth networks are described. At least one embodiment includes a method for operating a wireless device in both a 802.11 network and a Bluetooth network. In accordance with some embodiments, the method comprises monitoring transmission of Synchronous Connection Oriented (SCO) slots over the Bluetooth network, informing an access point (AP) in the 802.11 network not to transmit to the device before the end of an SCO slot, transmitting a power save trigger to the AP to retrieve buffered data from the AP, and transmitting data to the AP.

20 Claims, 16 Drawing Sheets

(51) Int. Cl.
*H04W 74/08* (2009.01)
*H04W 88/06* (2009.01)

(56) References Cited

U.S. PATENT DOCUMENTS

| | | |
|---|---|---|
| 2005/0025104 A1 | 2/2005 | Fischer et al. |
| 2005/0025174 A1* | 2/2005 | Fischer et al. ............... 370/445 |
| 2005/0135295 A1 | 6/2005 | Walton et al. |
| 2005/0136913 A1 | 6/2005 | Kampen et al. |
| 2005/0187001 A1 | 8/2005 | Fishel |
| 2005/0237984 A1 | 10/2005 | Benveniste |
| 2006/0211372 A1* | 9/2006 | Shellhammer et al. ...... 455/41.2 |
| 2006/0252443 A1 | 11/2006 | Sammour et al. |

OTHER PUBLICATIONS

United States Patent and Trademark Office; International Search Report and Written Opinion; PCT Application No. PCT/US07/83150; May 20, 2008.

United States Patent and Trademark Office; International Preliminary Report on Patentability; PCT Application No. PCT/US07/86003; Oct. 7, 2009.

* cited by examiner

SYSTEMS AND METHODS FOR COEXISTENCE OF WLAN AND BLUETOOTH NETWORKS

CROSS-REFERENCE TO RELATED APPLICATION

This application claims priority to, and the benefit of, U.S. Provisional Patent Application entitled, "Bluetooth Coex Scenarios (Using 802.1 1 NAVs to Prevent Collisions between Access Point Beacons or Data Frame Transmission and Bluetooth Transmissions)," having Ser. No. 60/861,799, filed on Nov. 30, 2006, which is incorporated by reference in its entirety.

TECHNICAL FIELD

The present disclosure generally relates to wireless communications and more particularly relates to systems and methods for allowing coexistence of WLAN and Bluetooth networks.

BACKGROUND

Wireless protocols such as Bluetooth and IEEE 802.11 define the logical interconnections of portable terminals having a variety of types of communication capabilities to host computers. The logical interconnections are based upon an infrastructure in which at least some of the terminals are capable of communicating wirelessly with another device when located within a predetermined range.

The Bluetooth standard provides a way to connect and exchange information between devices such as mobile phones, wireless headsets, laptops, PCs, printers, digital cameras, etc. over a secure, globally unlicensed short-range radio frequency. The protocol operates in the license-free ISM (industrial, scientific and medical) band from 2.4-2.4835 GHz. Over time, Bluetooth has become popular for such applications as wireless communication/control between mobile phones and a hands-free headsets. Other applications include wireless networking between PCs in addition to networking between PCs and output devices such as mouse devices and printers.

The IEEE standard for 802.11 is set out in "Wireless LAN Medium Access Control (MAC) and Physical Layer (PHY) Specifications" and is available from the IEEE Standards Department, Piscataway, N.J. The 802.11 standard permits either IR or RF communications at 1 Mbps, 2 Mbps and higher data rates and performs a medium access technique similar to carrier sense multiple access/collision avoidance (CSMA/CA). The 802.11 standard further provides a power-save mode for battery-operated mobile stations, seamless roaming in a full cellular network, high throughput operation, diverse antenna systems designed to eliminate "dead spots," and an easy interface to existing network infrastructures.

As both Bluetooth and 802.11 WLANs share the same unlicensed frequency band (i.e., the 2.4 GHz band), this can lead to collisions between the two networks. Accordingly, various needs exist in the industry to address the aforementioned deficiencies and inadequacies.

SUMMARY

Briefly described, one embodiment, among others, includes a method for operating a wireless device in both a 802.11 network and a Bluetooth network. In accordance with some embodiments, the method comprises monitoring transmission of Synchronous Connection Oriented (SCO) slots over the Bluetooth network, informing an access point (AP) in the 802.11 network not to transmit to the device before the end of an SCO slot, transmitting a power save trigger to the AP to retrieve buffered data from the AP, and transmitting data to the AP.

Another embodiment includes a wireless communication device capable of operating in both a 802.11-based network and a Bluetooth network. In some embodiments, the device comprises a timer module and a communications module. The timer module is configured to monitor and determine the timing of Synchronous Connection Oriented (SCO) slots. The communications module is configured to notify an access point (AP) not to transmit data based on the timing of the SCO slots and transmit power save trigger frames to retrieve data from the AP.

Yet another embodiment includes a method for operating a wireless device in both a 802.11 network and a Bluetooth network. According to some embodiments, the method comprises determining the beginning of a first SCO slot, setting a Network Allocation Vector (NAV) which ends before the end of the first SCO slot at an access point (AP) in the 802.11 network so that the AP stops transmitting data to the device, transmitting a power save trigger to the AP to retrieve buffered data from the AP, transmitting data to the AP, and receiving data from the AP at the end of the first SCO slot.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4-7 provide non-limiting examples where exemplary methods for coexisting in both a WLAN and a Bluetooth environment are incorporated.

DETAILED DESCRIPTION

Figure 1A:
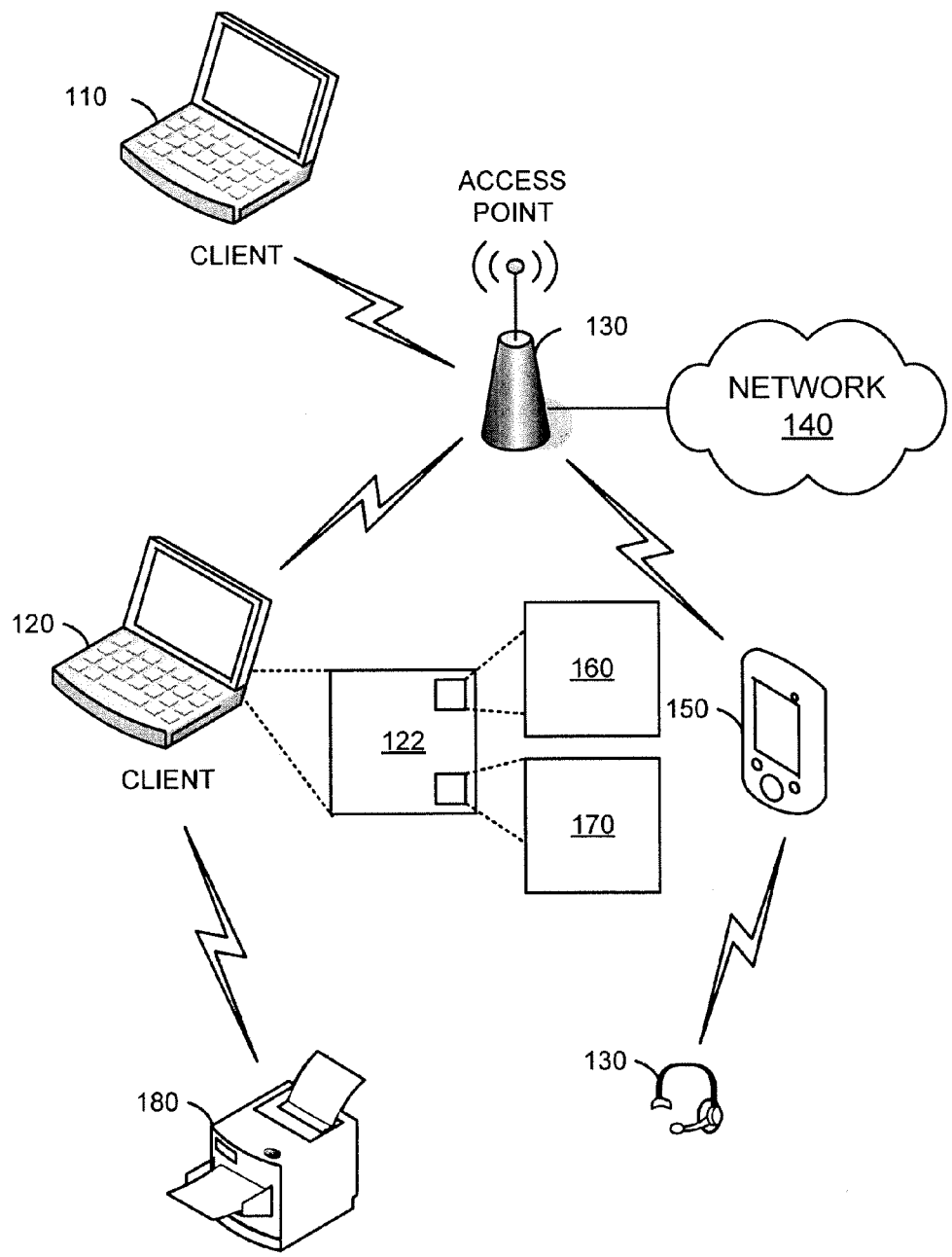
FIG. 1A depicts an embodiment of a system configured to coexist in both a WLAN and a Bluetooth network.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As discussed earlier, the Bluetooth and 802.11 WLANs share the same unlicensed frequency band, in particular the 2.4 GHz band. Consequently, this can lead to collisions between the two networks. Furthermore, one application that relies on the coexistence of Bluetooth and WLAN devices involves placing a voice call using a Bluetooth wireless earpiece and a handheld device (via SCO slots), where the voice data is then routed over a WLAN to an access point (AP) and ultimately through a wired long distance infrastructure, such as the Internet.

The IEEE 802.15.2-2003 Recommended Practices addresses the issue of coexistence of Wireless Personal Area Networks (WPAN) with other wireless devices operating in unlicensed frequency bands such as those utilized by wireless local area networks (WLAN). The IEEE 802.15 Coexistence Task Group 2 (TG2) developed a Recommended Practices to facilitate coexistence of WPAN and WLAN. The Task Group specifically developed a Coexistence Model to quantify the mutual interference of a WLAN and a WPAN. The Task Group also developed a set of Coexistence Mechanisms to facilitate coexistence of WLAN and WPAN devices.

The IEEE 802.15.2 Recommended Practices define an interface between collocated Bluetooth and WLAN units, where each Bluetooth unit can request channel access and provide an indication of activity. It should be noted that through the PTA (Packet Traffic Arbitration) interface, the WLAN may determine and predict the timing of Bluetooth SCO (Synchronous Connection Oriented) slots, which are used to convey high priority traffic such as voice. This is just one technique and other configurations in which the WLAN unit may determine or predict the timing of SCO slots associated with Bluetooth units may be possible. Based on the SCO slot timing obtained via the PTA interface, the WLAN client can time its transmissions so as to not interfere with the SCO slows. However, one perceived shortcoming with this approach is that the timing of transmissions from the AP is beyond the immediate control of the WLAN client.

One approach to addressing this apparent shortcoming is through utilization of polled power conservation methods where legacy PSM (PS-Poll or CAM/PSM switching) and U-APSD (Unscheduled Asynchronous Power Save Delivery) are utilized to influence the timing of transmissions from the AP. The timing associated with the PSM (Power Save Mode) trigger frame (trigger frame for U-APSD, PS-Poll frame for legacy PSM, or a frame with the PM bit not set for CAM/PSM (Continually Awake Mode/Power Save Mode) switching) provides approximate timing of any downlink transmission from the AP down to the client as the AP will refrain from transmitting to clients currently in power save mode unless the clients send a PSM trigger frame.

Based on this method, the time between successive SCO slots is used for the trigger frame, the uplink voice frame, the AP turnaround time, and the downlink voice frame. For low PHY rates on the WLAN, the time required for these events will exceed the time between SCO slots, effectively barring these PHY rates for use in this scenario. Inside the SCO slots, Bluetooth devices use high quality voice transmissions. This may comprise HV3 (High Quality Voice) over a SCO link, for instance. With HV3, the uplink and downlink SCO slots take 1250 µs to complete where the time between SCO slots is 2500 µs. Further details regarding use of PSM frames to influence the timing of downlink WLAN transmissions for the purpose of avoiding conflicts with SCO slots is described in U.S. patent application Ser. No. 10/861,064 (Pub. No. 2005/0025174), filed Jun. 4, 2004, herein incorporated by reference in its entirety.

As known by those skilled in the art, the Network Allocation Vector (NAV) relates to a method for avoiding collisions in a shared transmission medium. Each client that wants to transmit data using the shared medium may first perform a RTS (Request to Send) with a NAV that indicates the time required to complete the desired transmission. If no collision is detected and if a clear-to-send (CTS) packet is sent, the shared medium is considered to be allocated to the client that generated the RTS during the time specified by the NAV. The RTS and the CTS each set a NAV locally around the respective senders of the RTS and the CTS. Generally, for 802.11, the NAV can be reset by the AP through the transmission of a Contention Free End (CF-End) frame, but for 802.11n, clients are also allowed to reset a NAV by transmitting a CF-End frame.

Embodiments of systems and methods described herein seek to address the perceived shortcomings discussed earlier by configuring the WLAN client to indirectly influence the time of transmissions from the AP. According to exemplary embodiments, the transmission of PSM trigger frames are timed such that uplink voice transmissions over the WLAN may be conducted before the beginning of the next SCO slot. For alternative embodiments, this may involve sending a PS-Poll trigger frame or U-APSD trigger frame. As part of the uplink voice and trigger transmissions, a short frame is included which sets a NAV at the AP that ends after the pending SCO slot. NAV protection uses the IEEE 802.11 virtual carrier sense mechanism to cause stations that detect the frame to set their internal carrier sense to the "busy" state, even if they do not sense radio frequency energy during the NAV protection interval.

Accordingly, an exemplary method for coexisting in both a 802.11-based network and a Bluetooth network comprises monitoring transmission of SCO slots sent over the Bluetooth network to determine timing of the SCO slots. The method further comprises transmitting a power save trigger frame according to the determined timing and setting a NAV to stop transmission from an access point. In some embodiments, the power save trigger frame is transmitted from a client to the access point between SCO slots, uplink transmission over the 802.11-based network takes place between SCO slots, and downlink transmission begins after the NAV expires.

By setting the NAV to end after the pending SCO slot, the response which includes buffered data from the AP is delayed until after the pending SCO slot. Notably, each WLAN voice transmission (both uplink and downlink) can then utilize almost the entire period between successive SCO slots, while the AP turnaround time is timed to coincide with the SCO slot itself. As such, it should be noted that more time becomes available for actual WLAN transmissions, thereby allowing use of lower PHY rates and ultimately resulting in better range for the WLAN. It should also be noted that to a certain extent, the SCO slot becomes protected from interference by other WLAN nodes. Finally, it should be emphasized that the AP turnaround time overlapping with the SCO slot increases the overall efficiency of medium utilization.

Setting a NAV at the AP requires the transmission of a frame which is not addressed at the AP, and which contains a Duration value inside the MAC header. For some embodiments, this can be a CTS frame addressed at the client. The CTS is transmitted at a rate that can be decoded by the AP. A lower rate is not required because the main purpose is to influence the timing of downlink transmissions at the AP, while setting a NAV in a too large area around the client is avoided. Furthermore, directional PHY mechanisms such as beamforming can be used to further focus setting of the NAV only at the AP. It is also possible that a new method is added to the IEEE 802.11 standard (or at WFA (WiFi Alliance) to set a temporary transmission restriction at the AP, which applies only to the related client. In this case, the frame should be addressed at the AP. The transmission restriction timing information may even be included inside the MAC header of the uplink data frame which is transmitted to the AP.

Reference is now made to FIG. 1A, which depicts an embodiment of a system configured to coexist in both a WLAN and a Bluetooth network. In particular, FIG. 1A illustrates atypical network configuration for communicating data between clients via an access point in a WLAN or 802.11-based network. As illustrated in the non-limiting example of FIG. 1A, a network 140 may be coupled to access point 130. In some embodiments, the network 140 may be the Internet, for example. The access point 130 can be configured to provide wireless communications to various wireless devices of clients 110, 120, 150. Depending on the particular configuration, the clients 110, 120, 150 may be a personal computer, a laptop computer, a mobile phone, a Personal Digital Assistant, and/or other device configured for wirelessly sending and/or receiving data. Furthermore, the access points 130 may be configured to provide WIFI services, WiMAX services, wireless SIP services and/or other wireless communication services. As a non-limiting example, the clients 110, 120 may be configured for WIFI communications (including, but not limited to 802.11, 802.11b, 802.11a/b, 802.11g, and/or 802.11n).

FIG. 1A also depicts various Bluetooth devices connected over a Bluetooth connection. For purposes of illustration, a printer 180 with an integrated Bluetooth interface is coupled to the client 120, which in addition to having a WLAN interface, also has a Bluetooth interface. FIG. 1A also depicts a mobile phone 150. The mobile phone 150 may be a smartphone capable of interfacing with both 802.11-based networks and Bluetooth-enabled devices such as the wireless earpiece 130 shown. The smartphone 150 may, for example, have connectivity to the Internet through the WLAN and provide mobile voices services through use of the earpiece 130. In this regard, the smartphone 150 is a client connected to the same wireless AP 130 that the other two clients 110, 120 are connected to.

As discussed earlier, one application that relies on the coexistence of Bluetooth and WLAN devices involves placing voice calls using a Bluetooth wireless earpiece 130 (such as the one depicted in FIG. 1) and a handheld device 150, where voice data is then routed over a WLAN to an AP 130 and ultimately through a wired long distance infrastructure, such as the Internet. One such application is voice-over-WLAN (or VOWLAN) which targets laptop computers, cell phones, and PDAs. In such devices, both Bluetooth and WiFi services need to operate simultaneously in the same device.

In order to coexist in both the WLAN and Bluetooth environments, the client 120 may include a timer module 160 configured to monitor and determine the timing of Synchronous Connection Oriented (SCO) slots transmitted over the Bluetooth network. The client 120 may further include a communications module 170 configured to transmit power save trigger frames according to the timing of SCO slots such that the uplink transmission over the 802.11-based network ends before the next SCO slot. The modules 160, 170 may be implemented in software, hardware, or a combination of both.

Figure 1B:
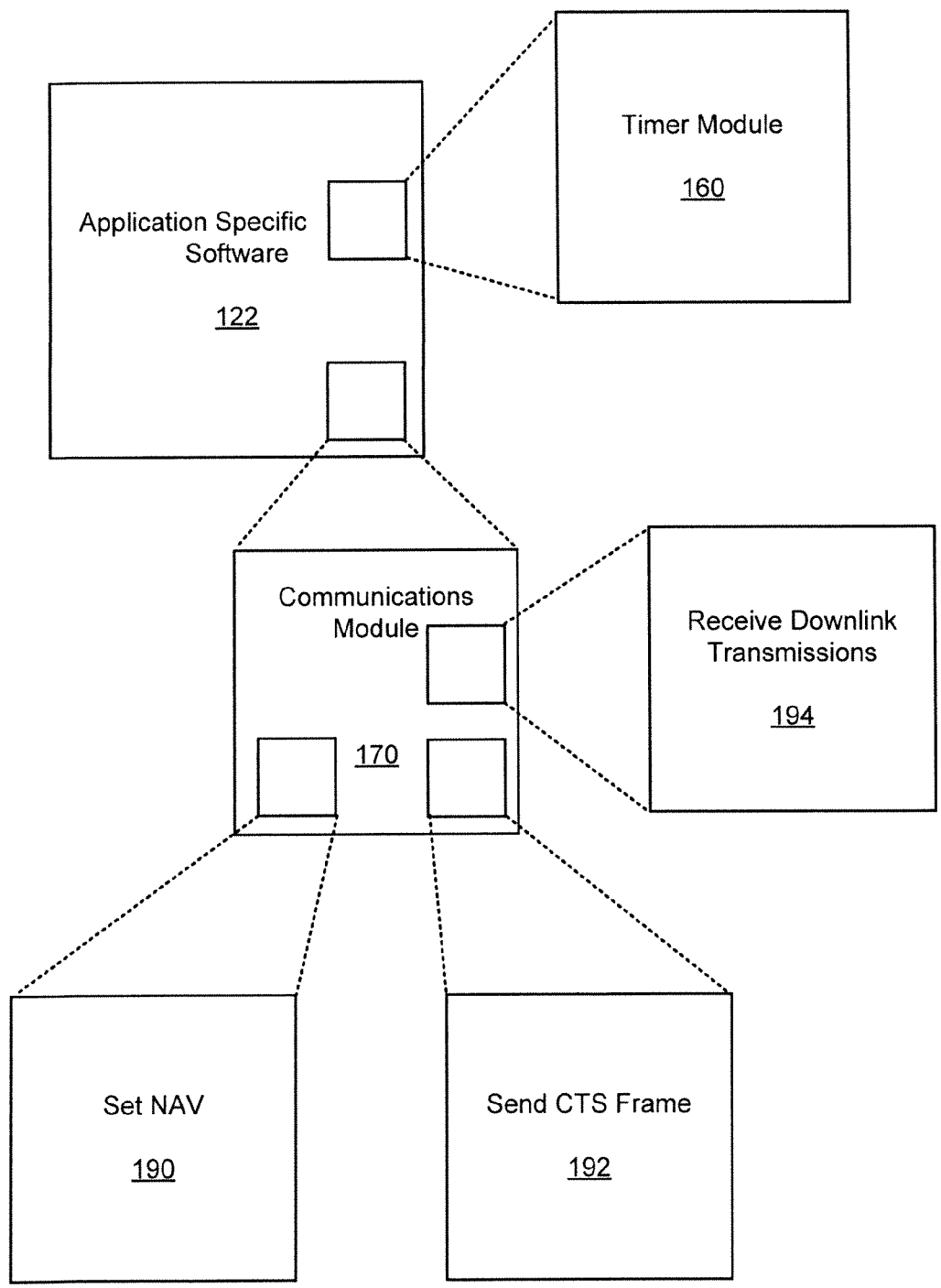
FIG. 1B illustrates various components of the communications module depicted in FIG. 1A.

FIG. 1B illustrates various components of the communications module depicted in FIG. 1A. In some embodiments, the communications module 170 may comprise logic 190 configured to set a Network Allocation Vector (NAV) such that the access point ceases transmission of data. The NAV is set so that the time in which it expires aligns with the end of an SCO slot. The communications module 170 further comprises logic 192 configured to send a clear-to-send (CTS) frame which specifies the duration of the NAV. Upon transmission of the CTS frame by logic 192, the NAV is set and expires upon reaching the time specified. The communications module 170 may further comprise logic 194 configured to receive downlink transmissions between successive SCO slots.

Figure 2:
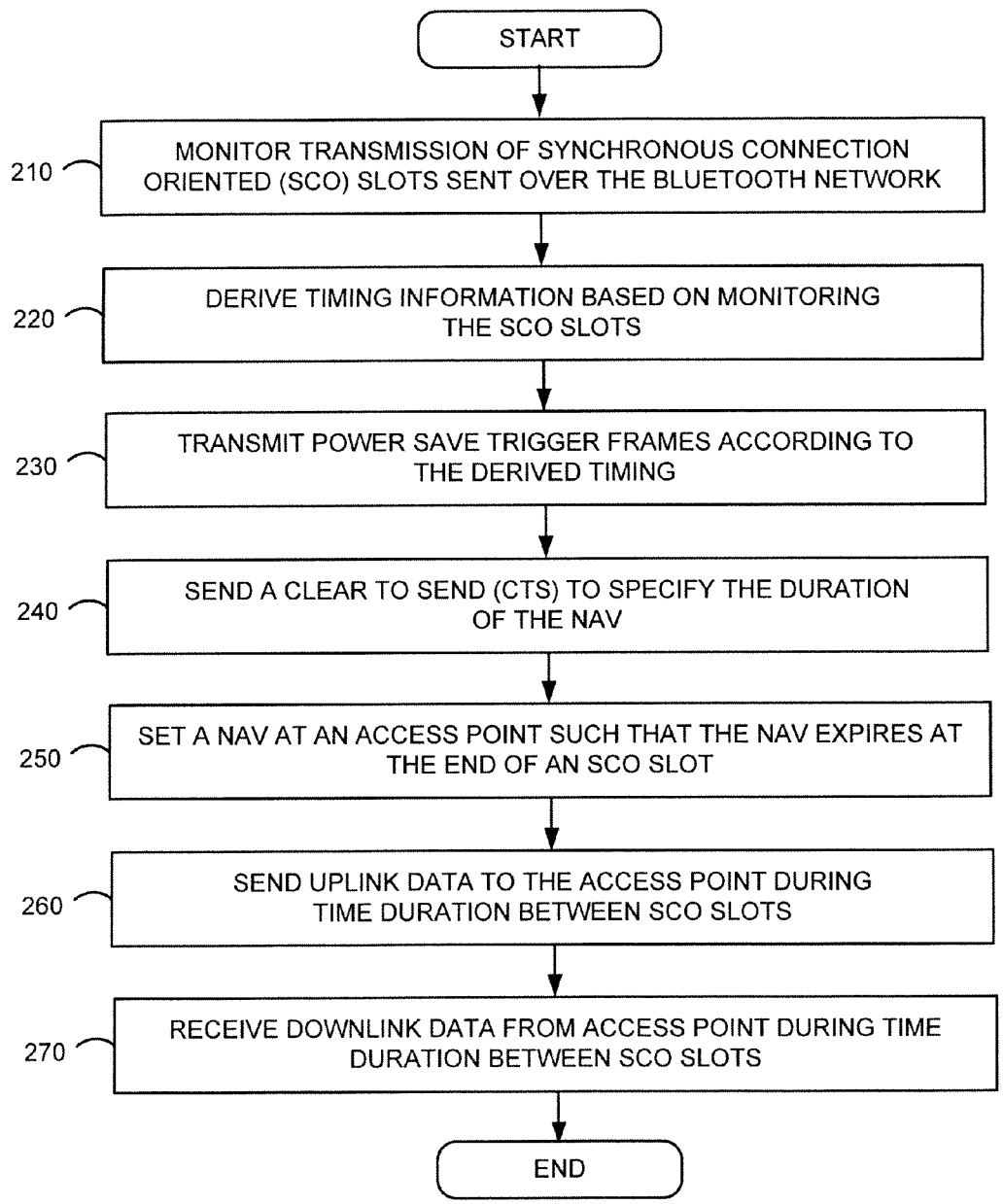
FIG. 2 depicts an embodiment of a method for coexisting in both a WLAN and a Bluetooth network.

Reference is now made to FIG. 2, which depicts an embodiment of a method for coexisting in both a WLAN and a Bluetooth network. Beginning in step 210, the transmission of SCO slots sent over the Bluetooth network is monitored. By monitoring the transmission of SCO slots, timing information is derived in step 220. In step 230, power save trigger frames are then transmitted according to the derived timing. A CTS frame may be used to specify the duration of the NAV (step 240). In step 250, a NAV is set so that it expires at the end of an SCO slot. Upon sending the CTS frame, uplink data is sent during the time duration between SCO slots so that interference can be avoided between the two protocols (step 260). In addition, transmission of downlink data is timed such that it takes place between SCO slots (step 270).

Figure 3:
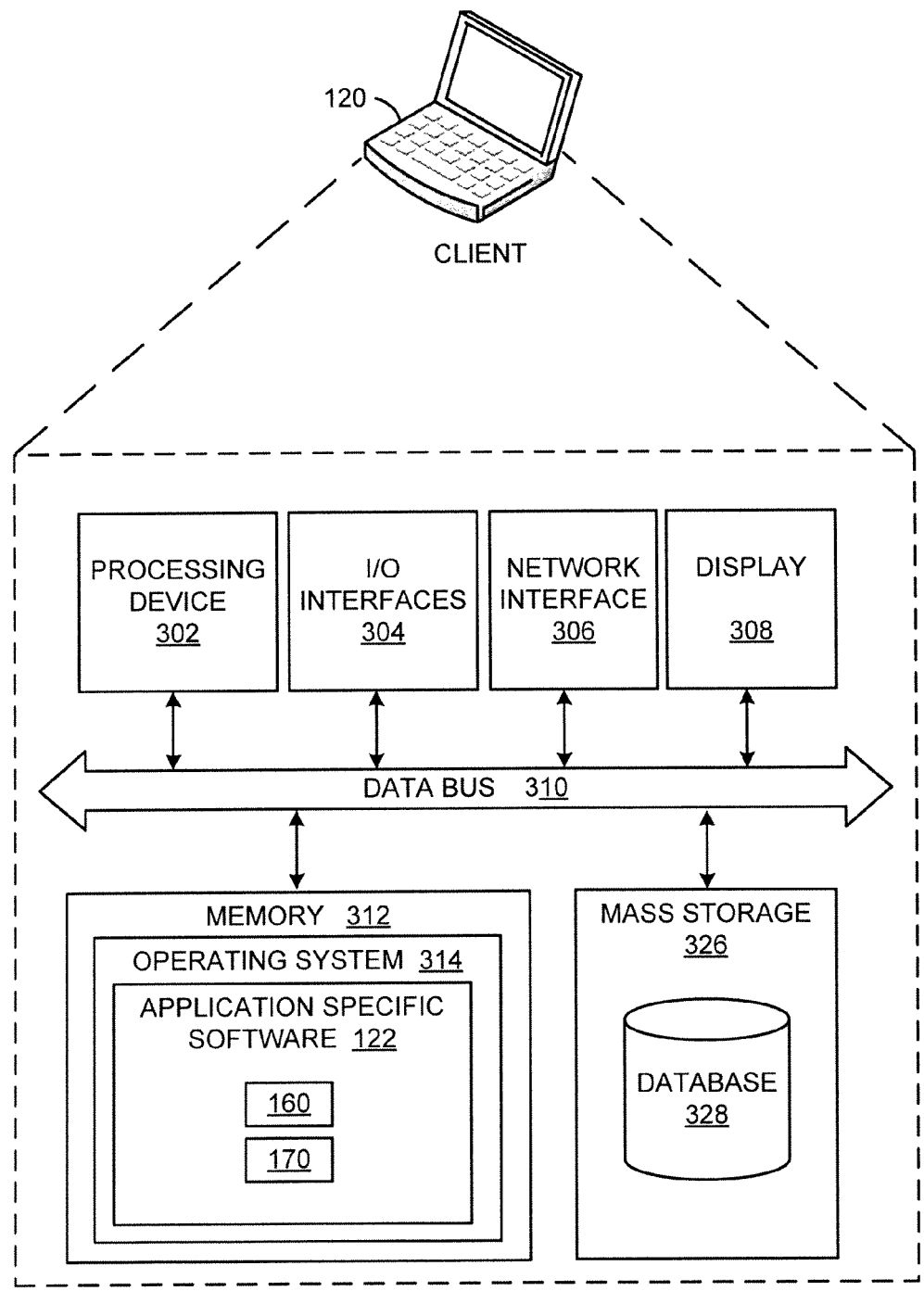
FIG. 3 illustrates an embodiment of the wireless device shown in FIG. 1A for executing the various steps depicted in FIG. 2.

FIG. 3 illustrates an embodiment of the wireless device shown in FIG. 1A for executing the various steps depicted in FIG. 2. Generally speaking, the client 120 can comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, the client 120 can, for instance, comprise memory 312, a processing device 302, a number of input/output interfaces 304, a network interface 306, a display 308, and mass storage 324, wherein each of these devices are connected across a data bus 310.

Processing device 302 can include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 312 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 122 such as the timer module 160 and communications module 170 depicted in FIG. 1. It should be noted, however, that the timer module 160 and communications module 170 can also be implemented in hardware or a combination of software and hardware. One of ordinary skill in the art will appreciate that the memory 312 can, and typically will, comprise other components which have been omitted for purposes of brevity.

Input/output interfaces 304 provide any number of interfaces for the input and output of data. For example, where the client 120 comprises a personal computer, these components may interface with user input device 304, which may be a keyboard or a mouse. Where the client 120 comprises a handheld device (e.g., PDA, mobile telephone), these components may interface with function keys or buttons, a touch sensitive screen, a stylist, etc. Display 308 can comprise a computer monitor or a plasma screen for a PC or a liquid crystal display (LCD) on a hand held device, for example.

With further reference to FIG. 3, network interface device 306 comprises various components used to transmit and/or receive data over a network environment. By way of example, the network interface 306 may include a device that can communicate with both inputs and outputs, for instance, a modulator/demodulator (e.g., a modem), wireless (e.g., radio frequency (RF)) transceiver, a telephonic interface, a bridge, a router, network card, etc.). The client 120 may further comprise mass storage 326. For some embodiments, the mass storage 326 may include a database 328 to store and manage such data as metadata.

Figure 4A:
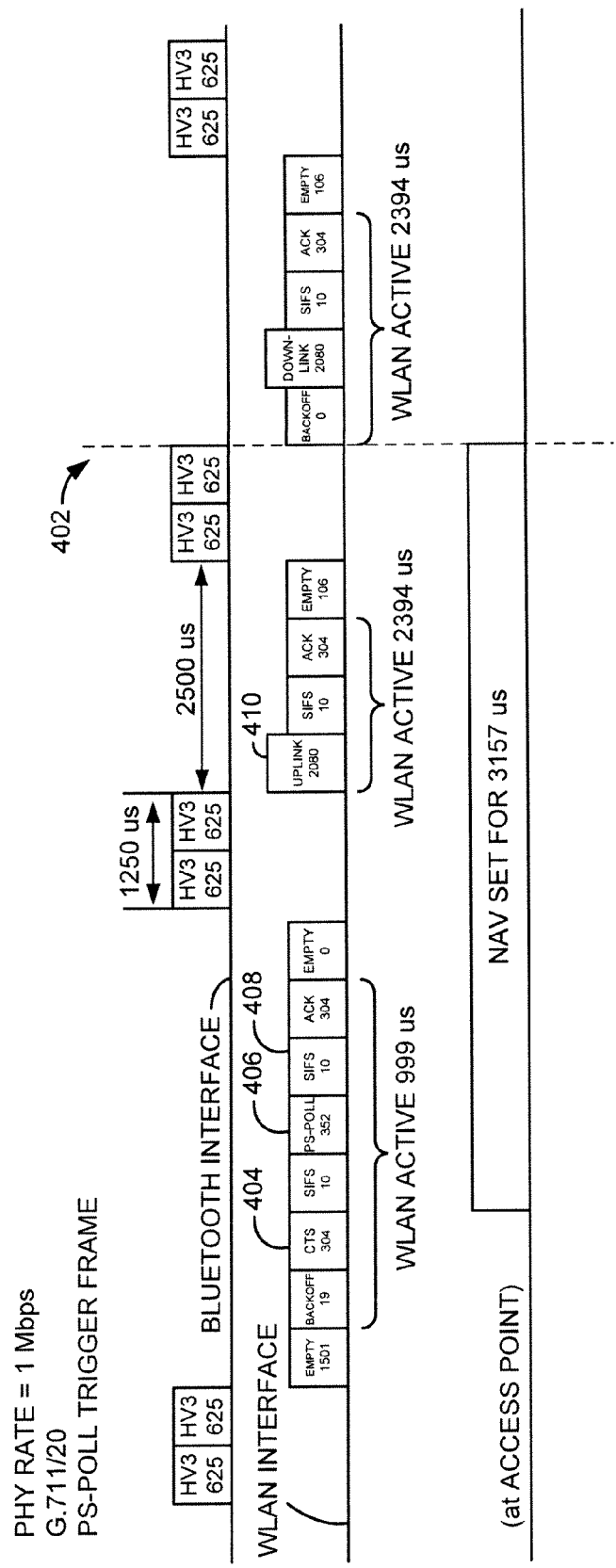
FIGS. 4A-C illustrate transmissions in both the Bluetooth environment and the WLAN where the PHY rate in the WLAN is 1 Mbps.
Figure 4B:
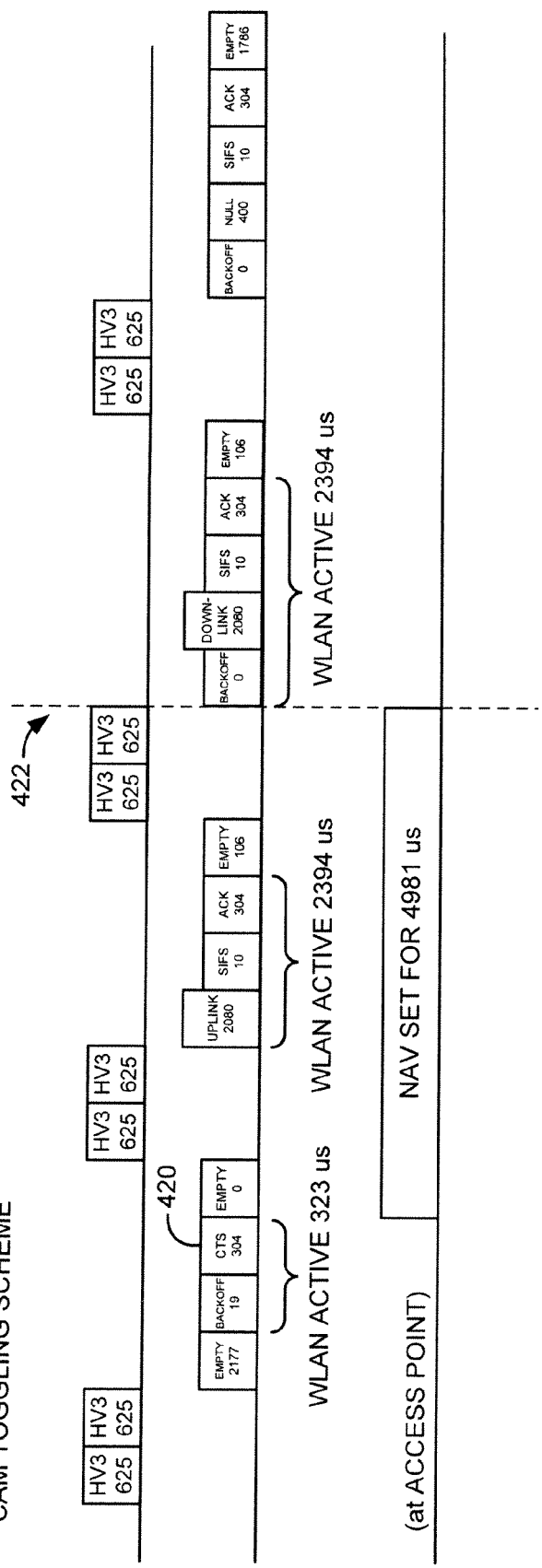
Figure 4C:
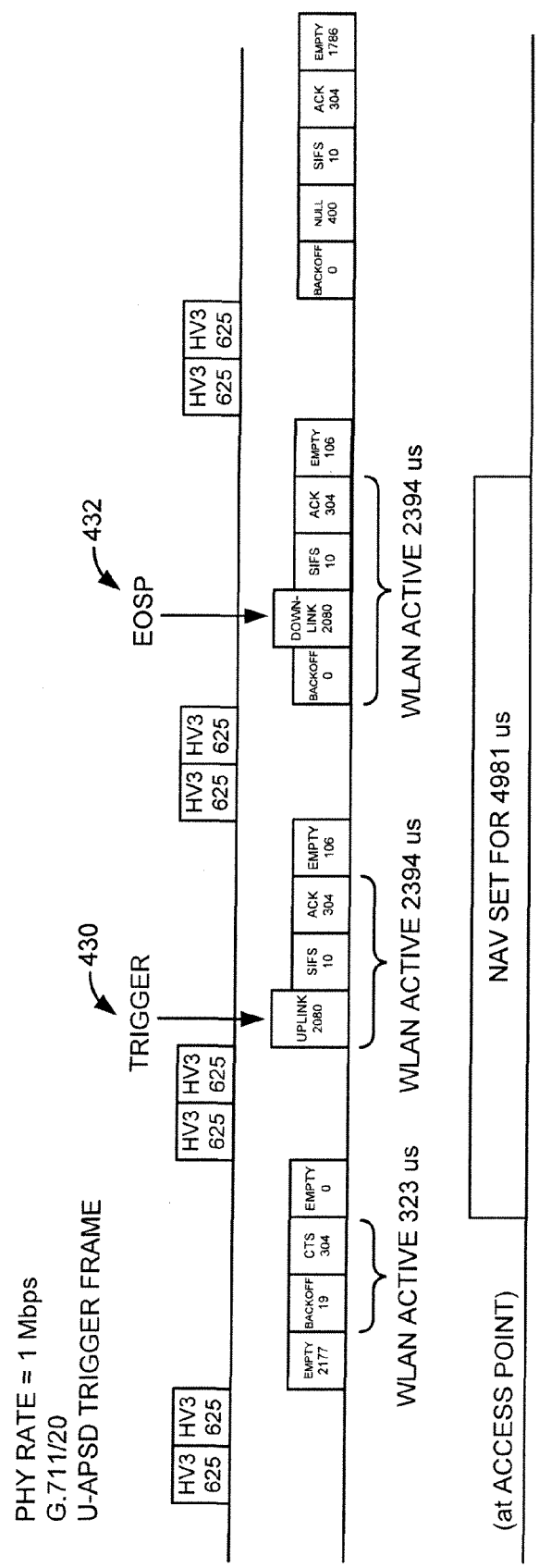
Figure 5A:
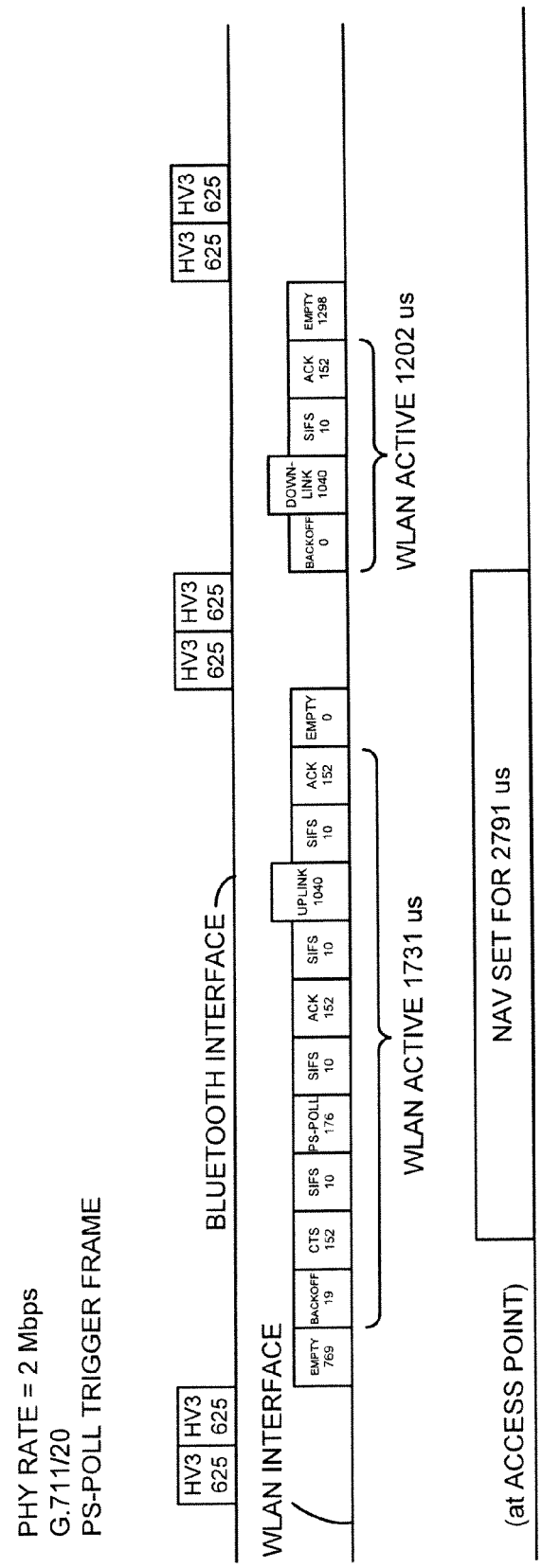
FIGS. 5A-C illustrate transmissions where the PHY rate in the WLAN network is 2 Mbps.
Figure 5B:
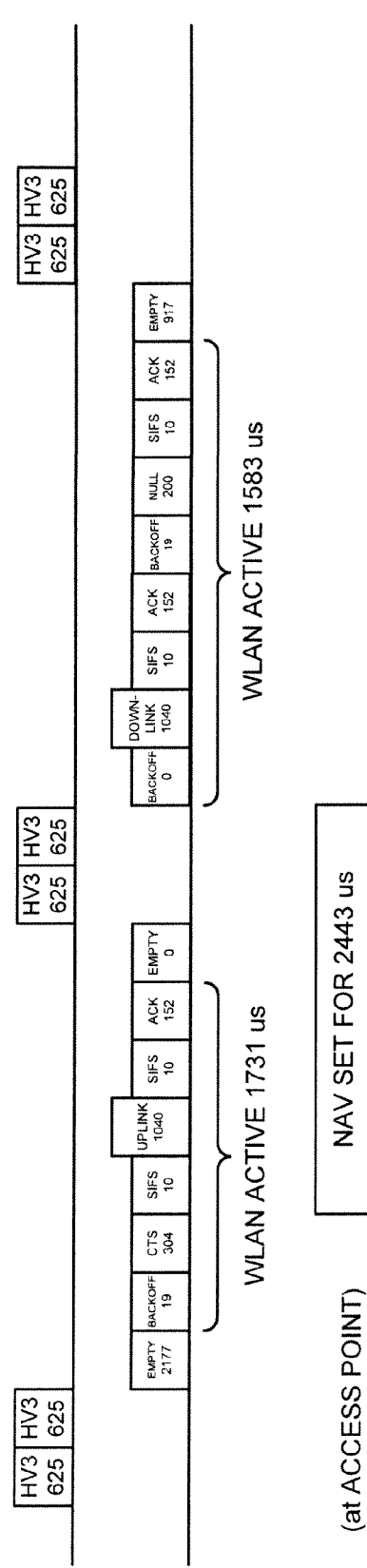
Figure 5C:
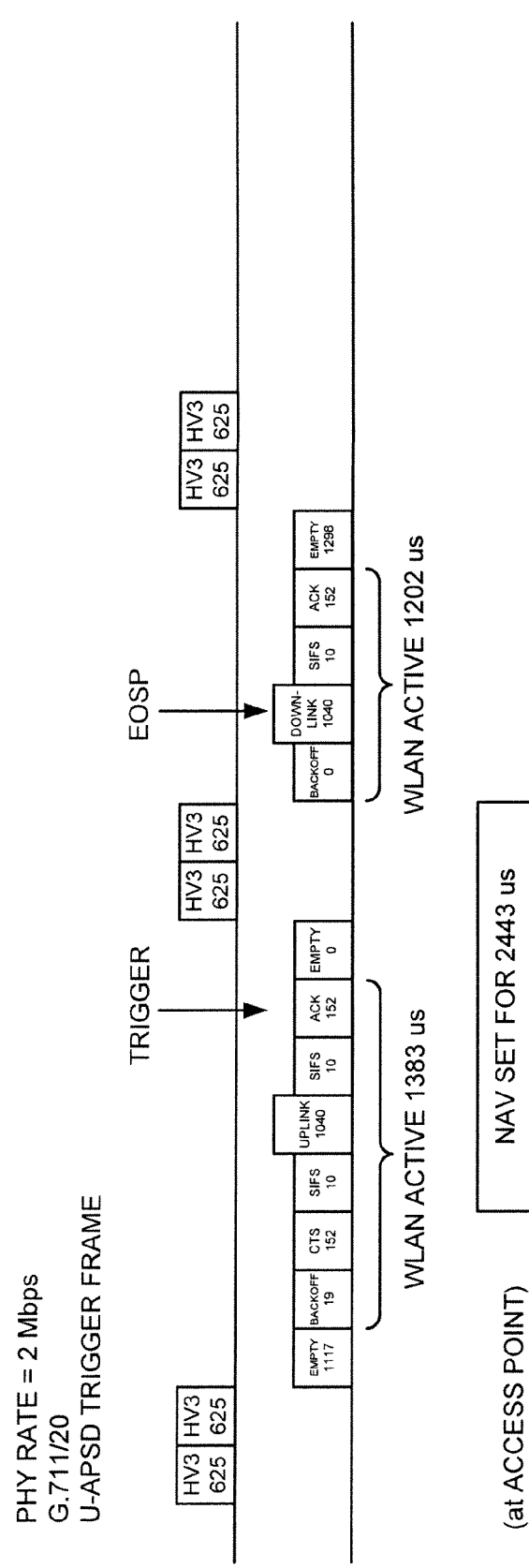
Figure 6A:
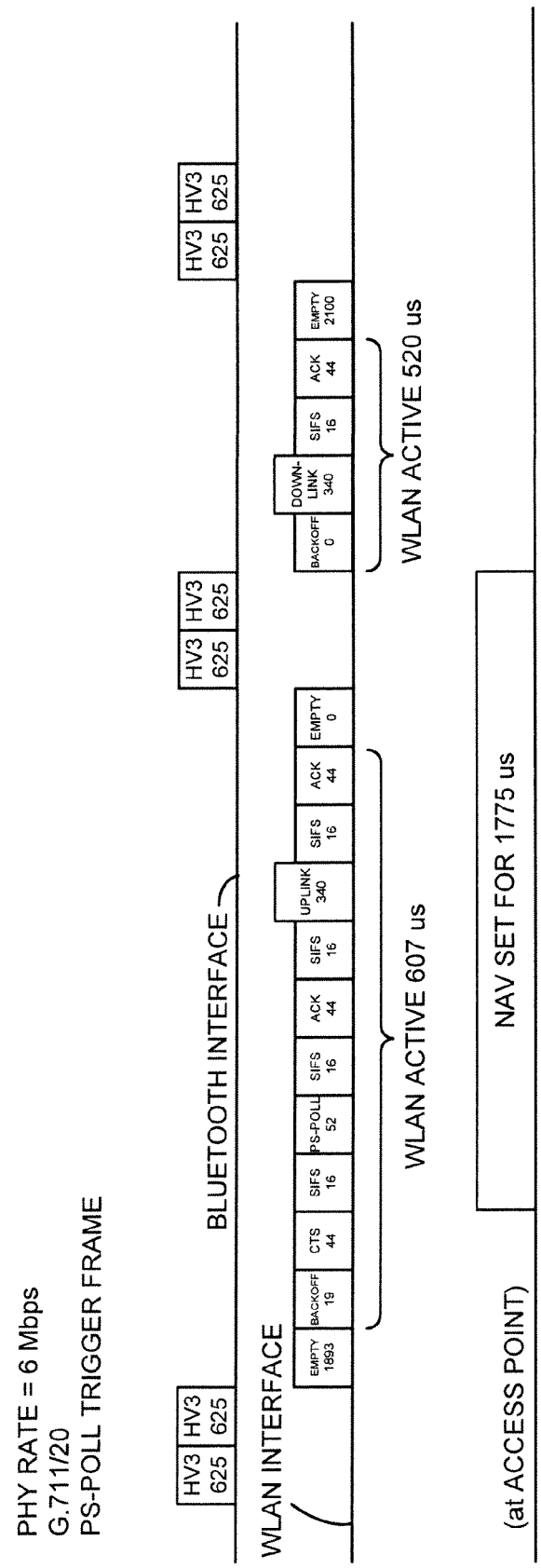
FIGS. 6A-C illustrate transmissions where the PHY rate in the WLAN network is 6 Mbps.
Figure 6B:
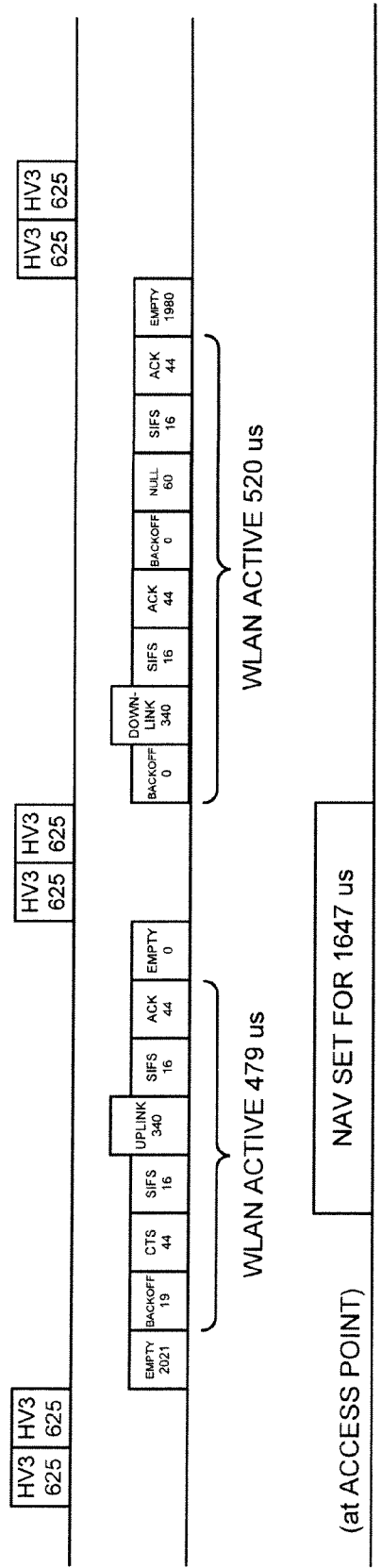
Figure 6C:
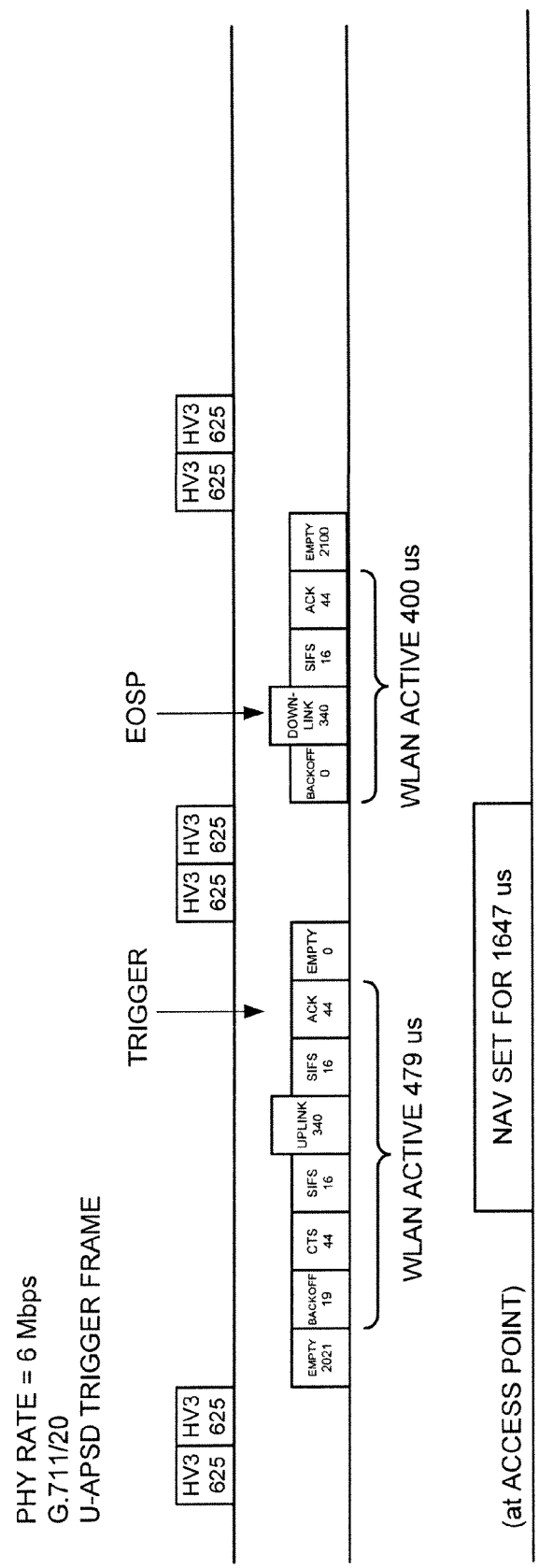
Figure 7A:
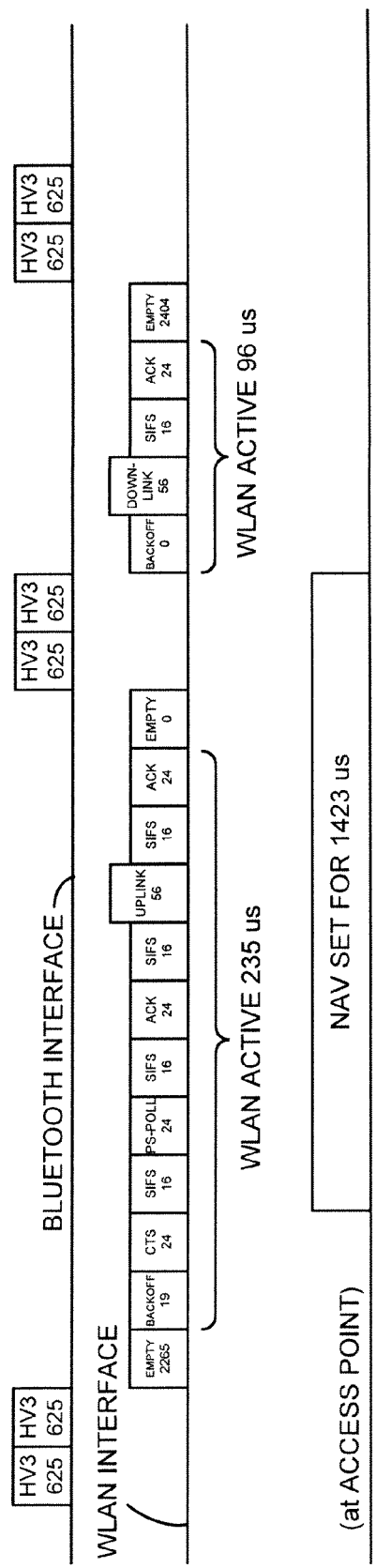
FIGS. 7A-C illustrate transmissions where the PHY rate in the WLAN network is 54 Mbps.
Figure 7B:
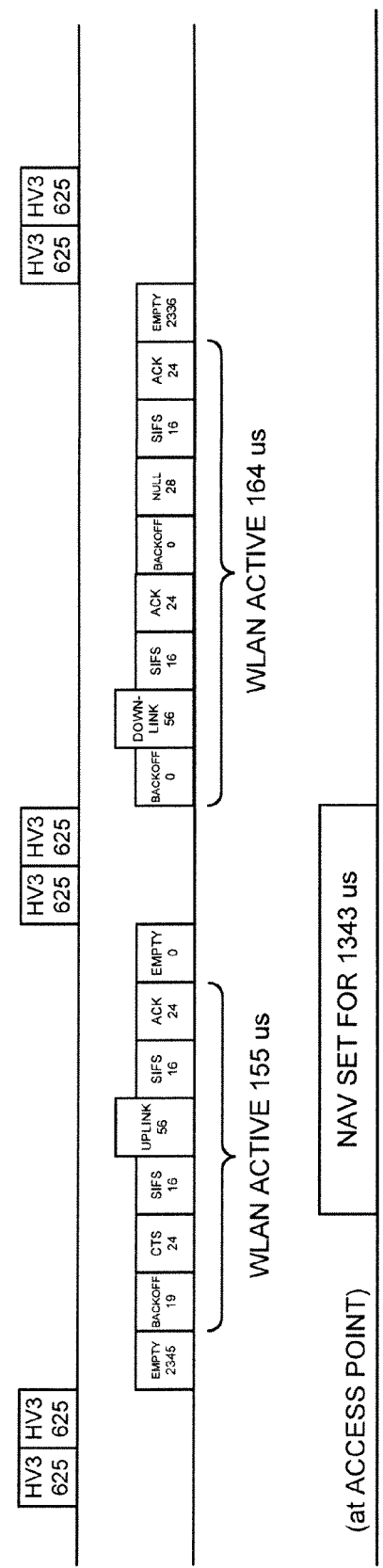
Figure 7C:
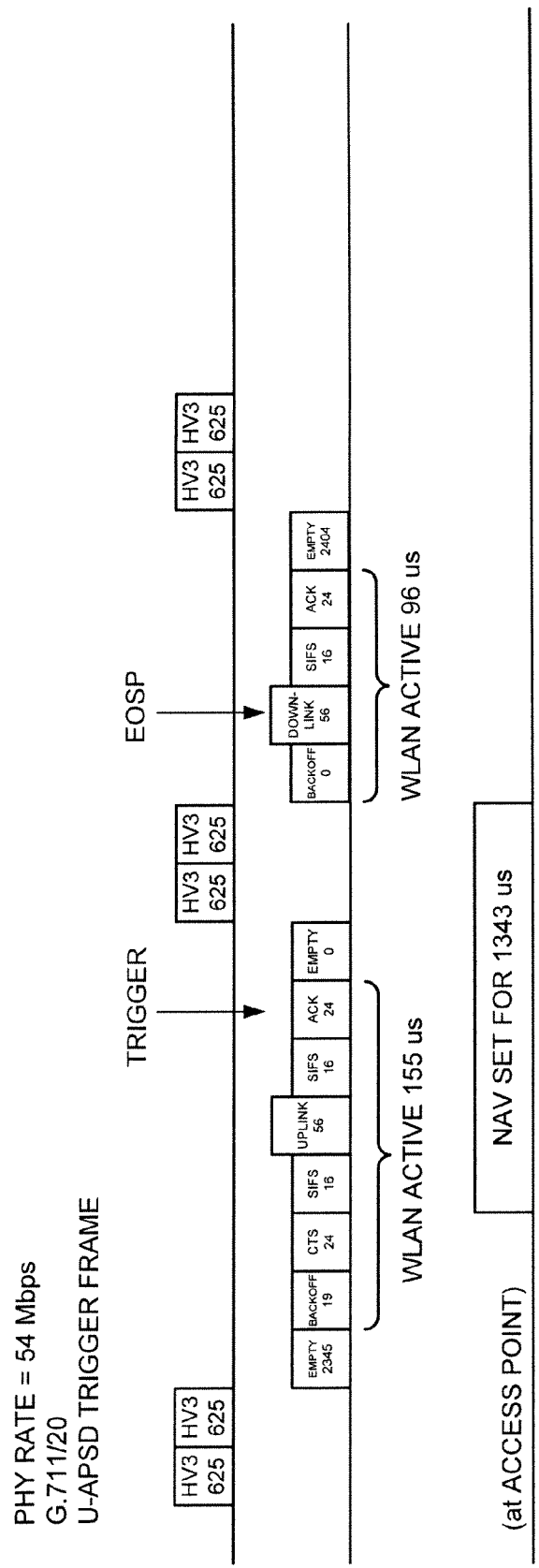

Reference is now made to FIGS. 4A-C, 5A-C, 6A-C, and 7A-C, which provide non-limiting examples where exemplary methods for coexisting in both a WLAN and a Bluetooth environment described earlier are incorporated. The figures illustrate use of a PS-Poll trigger frame, a CAM toggling scheme, and a U-APSD trigger frame to indirectly influence the time of transmissions from the AP. In particular, FIGS. 4A-C illustrate transmissions in both the Bluetooth environment and the WLAN where the PHY rate in the WLAN is 1 Mbps. FIGS. 5A-C illustrate transmissions where the PHY rate in the WLAN network is 2 Mbps. FIGS. 6A-C illustrate transmissions where the PHY rate in the WLAN network is 6 Mbps. FIGS. 7A-C illustrate transmissions where the PHY rate in the WLAN network is 54 Mbps. It should be noted again that the components depicted in the drawings are not necessarily drawn to scale and emphasis is placed upon clearly illustrating the exemplary embodiments described herein.

In accordance with exemplary embodiments described herein, 802.11 compliant devices 110, 120, 150 such as the ones depicted in FIG. 1A switch to a power save mode when not engaged in network communication. An access point 130 buffers incoming data for such power-saving 802.11 compliant devices 110, 120, 150 and sends a beacon signal after a pre-defined time interval indicating the presence of buffered data for the power-saving 802.11 compliant devices 110, 120, 150. Such devices 110, 120, 150 switch from the power save mode to an active mode to receive and check the beacon signal for any indication of buffered data at the access point for the device. If there is any indication of buffered data at the access point, the device sends a Power Save-Poll (PS-Poll) to the access point 130 requesting the access point 130 to send the buffered data to the device 110, 120, 150.

The access point 130 responds by transmitting buffered data to the device 110, 120, 150. The buffered data is transmitted in the form of data frames, which carry an indication of any additional buffered data at the access point. If there is such an indication, then the device 110, 120, 150 transmits another PS-Poll and receives the additional buffered data. This process repeats until there is no further indication of additional buffered data at the access point. Thereafter, the device 110, 120, 150 switches back to the power save mode, thereby conserving power. FIGS. 4A, 5A, 6A, and 7A depict use of the PS-Poll trigger frames for varying PHY rates ranging from 1 Mbps to 54 Mbps.

With reference to FIG. 4A, when the PHY rate is very low (i.e., on the order of 1 Mbps), the CTS frame, PS-Poll frame and uplink voice transmission do not fit between two adjacent HV3 SCO slots (i.e., 2500 μs). As such, the CTS 404 and PS-Poll 406 frames are sent one inter-SCO gap earlier, as depicted in FIG. 4A. The device sends a CTS frame 404 and a PS-Poll frame 406 to the access point to request the access point to send buffered data to the device. The access point responds to the PS-Poll frame with an ACK frame after an SIFS (short interframe space) 408 delay. During the ensuing inter-SCO gap, the device generates uplink data 410.

Uplink transmission 410 takes place in the ensuing gap, and downlink transmission follows accordingly. It should also be noted that upon transmission of the CTS frame 404, the NAV is set for 3,157 μs and expires at the end of an SCO slot at time instance 402. During this time interval, no traffic is sent from the access point. As noted earlier, the response from the access point, which includes buffered data, is delayed until after this pending SCO slot. One should note that, depending on the particular configuration, the interval times and/or data frame times may differ from those described with regard to the figures shown. Similarly, the amount of data transmitted in a data frame may differ, depending on the particular configuration. The values given for these parameters are included for purposes of illustration and are not intended to limit the scope of this disclosure.

Wireless devices generally have two power consumption modes: Constantly Awake Mode (CAM) and Power Save Polling (PSP). Power Save Polling causes the card to "sleep" on a periodic basis, turning its radio signal off. In CAM, the client adapter is kept powered up continuously so that there is little lag in message response time. FIGS. 4B, 5B, 6B, and 7B illustrate use of CAM toggling to achieve coexistence of Bluetooth and WLAN VoIP transmissions. With reference to FIG. 4B, the device sends a CTS frame which specifies the duration of the NAV. In the non-limiting example shown in FIG. 4B, the duration of the NAV is 4,981 μs. Upon transmission of the CTS frame 420, the NAV is set and expires upon reaching the time specified (time instant 422 which aligns with the end of an SCO slot). At this time, the access point generates downlink traffic to the device. In the next inter-SCO gap after sending the CTS, the device sends uplink data with the PM bit not set so that the AP will send downlink traffic after expiration of the NAV.

Unscheduled Asynchronous Power Save Delivery (U-APSD) is a power save mechanism for 802.11-based systems in which the communications device 110, 120, 150 sends a trigger frame to an access point 130 (for instance an uplink voice frame), which is then acknowledged by the access point 130. Transmission of the trigger frame is depicted in FIGS. 4C, 5C, 6C, and 7C. With reference to FIG. 4C, at some time after receiving the trigger frame 430, the access point responds with the buffered downlink traffic. The time for the response to begin may take some time, because the buffered data may be stored in a portion of the access point's memory, which may have higher access latency, due to the design of the access point and the possibly large amount of data to buffer at the access point.

During the turnaround time, the client may remain in a normal operation mode and remain in receive mode until the client receives a response from the AP. On the final buffered downlink frame, the AP may set an End Of Service Period (EOSP) bit 432, which is an indication for the clients that the service period has ended and that it can return to a power save mode, where at least one of the active components utilized during normal operation is deactivated during a period of communicative inactivity. Similarly, PS-Poll based power saving may operate in a similar fashion, except that there may only be a single downlink Media Access Control (MAC) Protocol Data Unit (MPDU). The timing associated with the trigger frame and the ESOP bit is illustrated in FIGS. 4C, 5C, 6C, and 7C, which illustrate use of the U-APSD trigger frame to control transmission from the access point.

As discussed earlier and as depicted in FIGS. 4A-C, 5A-C, 6A-C, and 7A-C, HV3 data frames are sent in a Bluetooth environment at regular intervals of 2500 µs, with the data frames being sent at 1250 µs. As such, the duration of each SCO slot is usually long enough for the AP to collect downlink data from its power-save repository. Notably, the probability is high that the AP will send the response soon after the end of an SCO slot (i.e., the NAV protected period). Furthermore, the probability is high that the AP will complete its transmission before the start of the next SCO slot, and therefore, collisions are avoided. When the turnaround time of the AP is relatively short and the WLAN PHY rate is relatively high, it is possible for the entire uplink and downlink VoIP exchange to take place in between two successive inter-SCO gaps. However, in anticipation of the event that the downlink transmission overlaps with an SCO slot, the uplink transmission and the downlink transmission may be split across consecutive inter-SCO gaps.

It should be further emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for operating a device in both a first network and a second network, the method comprising:
   monitoring transmission of synchronous connection oriented slots over the second network;
   informing an access point (AP) in the first network not to transmit to the device before the end of a synchronous connection oriented slot by setting a network allocation control at the AP, wherein the network allocation control expires at the end of the synchronous connection oriented slot;
   transmitting a power save trigger to the AP to retrieve buffered data from the AP, wherein the power save trigger is a power save poll, a data frame with a power management control, or an unscheduled asynchronous power save trigger, wherein the data frame with the power management control is transmitted in a next-inter synchronous connection oriented gap after sending clear to send data; and
   transmitting data to the AP.

2. The method of claim 1, wherein the AP sends the buffered data to the device across consecutive gaps between synchronous connection oriented slots after the end of a first synchronous connection oriented slot.

3. The method of claim 2, wherein the data is a voice frame.

4. The method of claim 2, wherein informing the AP occurs in an unscheduled period before a second synchronous connection oriented slot that precedes the first synchronous connection oriented slot.

5. The method of claim 4, wherein the transmitting of the power save trigger occurs in the unscheduled period before the second synchronous connection oriented slot.

6. The method of claim 1, wherein the setting the network allocation control comprises sending the clear to send data.

7. The method of claim 1, wherein the informing the access point comprises sending timing information to the AP other than through the network allocation control, and the AP transmits downlink data after expiration of the network allocation control.

8. The method of claim 7, wherein the timing information is conveyed as part of a media access control of a data frame containing the timing information.

9. The method of claim 1, further comprising sending the data frame with the power management control set after a third synchronous connection oriented slot, wherein the third synchronous connection oriented slot occurs after a first synchronous connection oriented slot.

10. The Method of claim 1, wherein the data comprises voice data.

11. A wireless communication device capable of operating in both a first network and a second network, the device comprising
   a timer module configured to monitor and determine a timing of synchronous connection slots; and
   a communications module configured to:
      notify an access point not to transmit data based on the timing of the synchronous connection slots; and
      transmit a power save control to retrieve the data from the access point, wherein the communications module notifies the access point not to transmit the data by setting a network allocation control such that the network allocation control expires at the end of a synchronous connection slot, wherein the power save control is a power save poll frame, a data frame with power management data, or an unscheduled asynchronous power save trigger frame, wherein the data frame with the power management data is transmitted in a next-inter synchronous connection slot gap after sending a clear to send frame.

12. The device of claim 11, wherein the communications module comprises logic configured to send the clear to send frame over the first network.

13. The device of claim 12 wherein the clear to send frame includes a duration field specifying duration of the network allocation control.

14. The device of claim 11, wherein the device is configured to support voice packets.

15. The device of claim 14, wherein the voice packets are High Quality Voice 3 (HV3) packets.

16. The device of claim 11, wherein the synchronous connection slot is a Bluetooth Synchronous Connection Oriented (SCO) slot, the network allocation control is a Network Allocation Vector (NAV), the power save control is a Power Save-Poll (PS-Poll) frame, a data frame with a power management data is a data from with a Power Management (PM) bit not set, and the unscheduled asynchronous power save trigger frame is an Unscheduled Asynchronous Power Save Delivery (U-APSD) trigger frame.

17. A method for operating a wireless device in both a first network and a second network, the method comprising:
   determining an end of a first synchronous slot;
   setting a network allocation control that ends at the same time as the end of the first synchronous slot at an access point (AP) in the first network so that the AP stops transmitting data to the device;
   transmitting a power save control to the AP to retrieve buffered data from the AP, wherein the power save control is one of a power save poll, a data frame with a power management control not set, and an unscheduled asynchronous power control, wherein the data frame with the power management control not set is transmitted in synchronous slot gap after sending a clear to send control;

transmitting data to the AP during a period set by the network allocation control and prior to a beginning of the first synchronous slot; and receiving other data from the AP after the end of the first synchronous slot.

18. The method of claim 17, wherein setting the network allocation control comprises sending the clear to send control.

19. The method of claim 17, wherein for the unscheduled asynchronous power control, the AP sets an end of service control to indicate that the client may enter into a power save mode.

20. The method of claim 17, wherein the end of service control is set on a final buffered downlink frame.

\* \* \* \* \*